United States Patent
Chen et al.

(10) Patent No.: US 10,628,478 B2
(45) Date of Patent: Apr. 21, 2020

(54) METHOD AND DEVICE THEREOF FOR USER INTERACTION BASED ON VIRTUAL OBJECTS AND NON-VOLATILE STORAGE MEDIUM

(71) Applicant: Shanghai zhangmen science and Technology Co., Ltd., Shanghai (CN)

(72) Inventors: Danian Chen, Shanghai (CN); Fei Wang, Shanghai (CN)

(73) Assignee: SHANGHAI ZHANGMEN SCIENCE AND TECHNOLOGY CO., LTD., Shanghai (CN)

(*) Notice: Subject to any disclaimer, the term of this patent is extended or adjusted under 35 U.S.C. 154(b) by 349 days.

(21) Appl. No.: 15/678,138

(22) Filed: Aug. 16, 2017

(65) Prior Publication Data

US 2018/0052841 A1 Feb. 22, 2018

(30) Foreign Application Priority Data

Aug. 16, 2016 (CN) .......................... 2016 1 0675278

(51) Int. Cl.
G06F 13/12 (2006.01)
G06F 16/435 (2019.01)
G06F 3/048 (2013.01)
G06F 16/635 (2019.01)
H04L 29/08 (2006.01)

(52) U.S. Cl.
CPC ............ *G06F 16/435* (2019.01); *G06F 3/048* (2013.01); *G06F 13/128* (2013.01); *G06F 16/635* (2019.01); *H04L 67/306* (2013.01)

(58) Field of Classification Search
CPC ...... G06F 3/048; G06F 16/635; G06F 16/435; G06F 13/128; H04L 67/306
See application file for complete search history.

(56) References Cited

U.S. PATENT DOCUMENTS

| 2011/0177914 A1* | 7/2011 | Park ................... A63B 24/0062 482/1 |
| 2016/0379415 A1* | 12/2016 | Espeset ................... G06T 15/04 345/633 |
| 2017/0148339 A1* | 5/2017 | Van Curen ............. G09B 9/003 |

* cited by examiner

*Primary Examiner* — Shean Tokuta
*Assistant Examiner* — Juan C Turriate Gastulo
(74) *Attorney, Agent, or Firm* — Bayramoglu Law Offices LLC (57) ABSTRACT

The present invention provides a method and device thereof for user interaction based on virtual objects. The first user characteristic information of a first user is acquired, wherein the first user characteristic information includes at least one of the action information, the aspect information and the speed information of the first user. A first virtual object is generated corresponding to the first user based on the first user characteristic information, wherein the first virtual object includes the appearance matching with the aspect information of the first user, and an action sequence to be executed which matches the action information of the first user. The first virtual object is provided to the user device corresponding to the first user.

18 Claims, 2 Drawing Sheets

METHOD AND DEVICE THEREOF FOR USER INTERACTION BASED ON VIRTUAL OBJECTS AND NON-VOLATILE STORAGE MEDIUM

CROSS REFERENCE TO RELATED APPLICATIONS

This application is based upon and claims priority to Chinese Patent Application No. CN201610675278.8 (CN), filed on Aug. 16, 2016, the entire content of which is incorporated herein by reference.

TECHNICAL FIELD

The present application relates to the communication field, particularly to a method and device thereof for user interaction based on virtual objects and a non-volatile storage medium.

BACKGROUND

In the prior art, the user can implement the application operation in the virtual scene by controlling virtual objects in the interactive application. For example, the virtual objects presented in a television, a personal computer, a mobile phone or other devices are controlled through operations to realize the interaction.

SUMMARY OF THE INVENTION

According to an aspect of the present invention, the present invention provides a method for user interaction based on a virtual object at a network device, including: acquiring first user characteristic information of a first user; generating a first virtual object corresponding to the first user based on the first user characteristic information; determining first interactive information, wherein the first interactive information is derived from the first user characteristic information; sending the first virtual object to the device of the second user that interacts with the first user; wherein the first virtual object includes the first interactive information.

According to another aspect of the present invention, the present invention also provides a method for user interaction based on a virtual object at a user device, including: acquiring first user characteristic information of the first user, wherein the first user characteristic information includes the action information of the first user and the aspect information of the first user; transmitting the first user characteristic information to the network device corresponding to the first user device.

According to another aspect of the present invention, the present invention also provides a computer-readable storage medium, and one or more instructions are stored in the computer-readable storage medium. Wherein, when the one or more instructions are executed by the processor, such that the processor performs: acquiring first user characteristic information of a first user; generating a first virtual object corresponding to the first user based on the first user characteristic information; determining first interactive information, wherein the first interactive information is derived from the first user characteristic information; sending the first virtual object and the first interactive information to the device of the second user that interacts with the first user; wherein the first virtual object is used to perform the first interactive information.

According to another aspect of the present on, the present invention also provides a computer-readable storage medium, and one or more instructions are stored in the computer-readable storage medium. Wherein, when the one or more instructions are executed by the processor, such that the processor performs: acquiring the first user characteristic information of the first user, wherein the first user characteristic information includes the action information of the first user and the aspect information of the first user; transmitting the first user characteristic information to the network device corresponding to the first user device.

According to another aspect of the present invention, the present invention also provides a user device, including: one or more processors; and a storage device for storing one or more instructions. When the one or more instructions are executed by the one or more processors, such that the one or more processors perform: acquiring the first user characteristic information of the first user, wherein the first user characteristic information includes the action information and the aspect information of the first user, and transmitting the first user characteristic information to a network device corresponding to the first user device.

BRIEF DESCRIPTION OF THE DRAWINGS

The other features, objects, and advantages of the present invention will become more apparent by reading the following detailed description of non-limiting embodiments, with reference to the accompanying drawings as below.

The same or similar reference labels in the drawings represent the same or similar parts.

DETAILED DESCRIPTION OF THE EMBODIMENTS

The invention will now be further described in detail with the drawings.

In a typical configuration of the present invention, one or more processors (CPU), an input/output interface, a network interface, and a memory are included in the terminal, the service network device, and the trusted party.

The memory may be a computer-readable medium, including a non-permanent memory, a random access memory (RAM), and/or the non-volatile memory and etc., such as a read-only memory (ROM) or a flash memory (flash RAM). The memory is an example of the computer-readable medium.

The computer-readable medium includes permanent, non-permanent, removable and non-removable medium, and the information storage can be realized through any method or technology. The information can be a computer-readable instruction, a data structure, a program module or other data. The examples of the computer storage medium include, but are not limited to a phase change memory (PRAM), a static random access memory (SRAM), a dynamic random access memory (DRAM), and other types of the random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storages, cartridge cassette, a magnetic tape storage or other magnetic storage devices or any other non-transmission medium, which can be used to store information that can be accessed by the computing device. As defined herein, a computer-readable medium does not include transitory media, such as modulated data signals and carriers.

Figure 1:
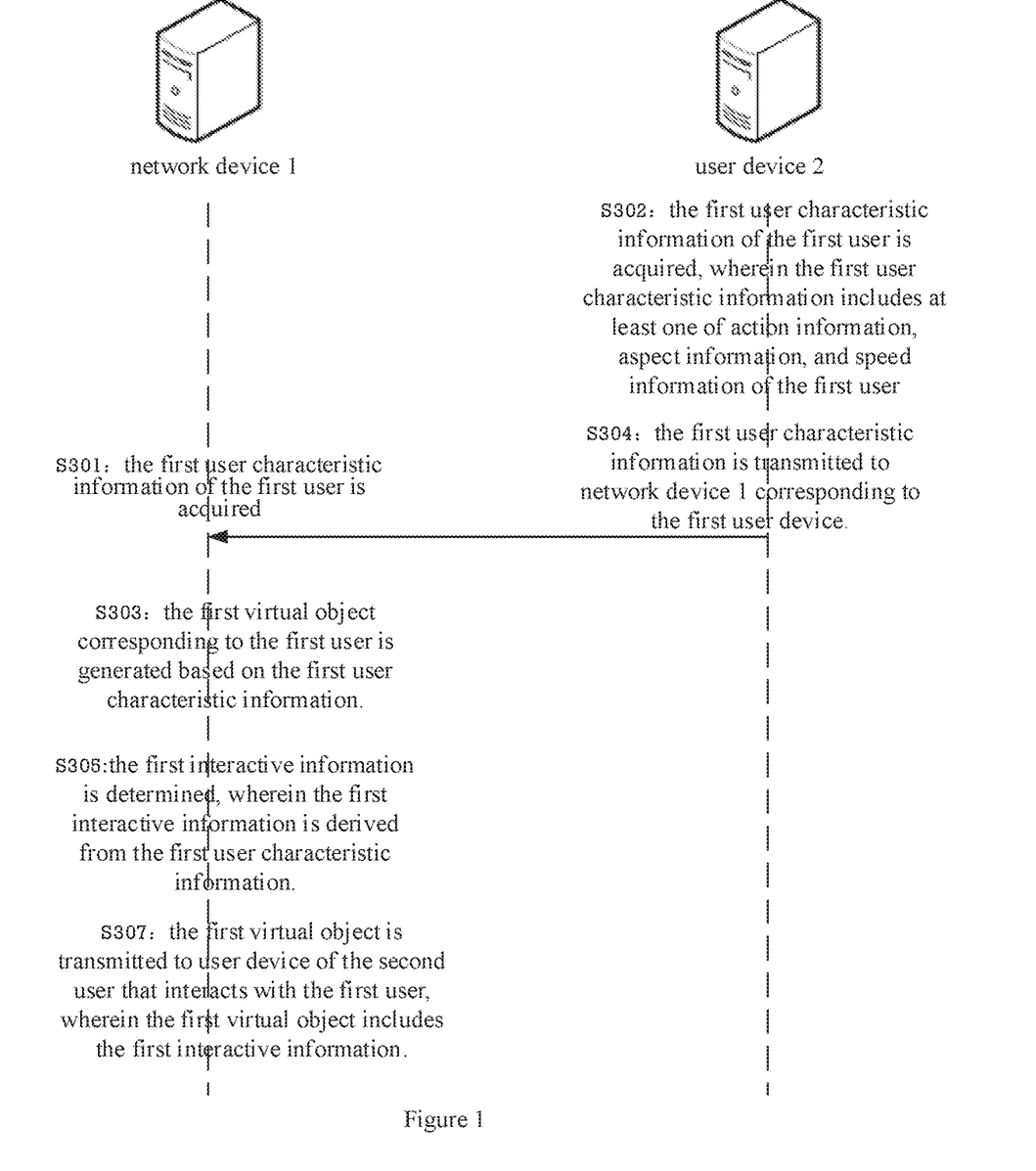
FIG. 1 shows a flow chart of a method for user interaction based on a virtual object at a network device and a user device according to some embodiments of the present invention.

FIG. 1 shows a flow chart of a method for user interaction based on a virtual object at a network device and a user device according to some embodiments of the present invention.

Wherein, in step S302, the first user characteristic information of the first user is acquired by user device 2, wherein the first user characteristic information includes action information and aspect information of the first user; in step S304, the first user characteristic information is transmitted to network device 1 by user device 2 corresponding to the first user device 2; then, in step S301, the first user characteristic of the first user information is acquired by network device 1; in step S303, the first virtual object corresponding to the first user is generated based on the first user characteristic information by network device 1; in step S305, the first interactive information is determined by network device 1, wherein the first interactive information is derived from the first user characteristic information; in step S307, the first virtual object is sent to a user device of the second user that interacts with the first user by network device 1, wherein the first virtual object includes the first interactive information.

Herein, network device 1 includes, but is not limited to a computer, a network host, a single network server, a set of a plurality of network servers, or a cloud composed of multiple servers; wherein the cloud is composed of a large number of computers or network servers based on cloud computing. Wherein, the cloud computing is a kind of the distributed computing, and is a virtual supercomputer composed of a group of loosely coupled computer sets. User device 2 includes various intelligent terminals, such as mobile intelligence devices, various personal computers, etc. Here, user device 2 can be an independent device and can also be loaded in other devices. For example, the user device can be loaded in a corresponding virtual reality device. Wherein the virtual reality device includes but is not limited to VR (i.e., Virtual Reality) device, or AR (i.e., Augmented Reality) device and etc. For another example, the user device can also loaded in a corresponding sport device, and the sport device includes but is not limited to treadmills, bicycles, elliptical machines, and etc. For another example, the user device can also be loaded in a corresponding acquisition device, and the acquisition device includes various information acquisition devices, which include but are not limited to various voice input/output devices, appearance acquisition devices and etc.

Specifically, in step S302, the first user characteristic information of the first user is acquired by user device 2. Herein, preferably, the first user characteristic information can include voice information of the first user; furthermore, the first user characteristic information can further include but is not limited to action information and aspect information of the first user, and other types of the characteristic information. Herein, user device 2 can receive the corresponding first user characteristic information from the other third party devices. For example, when the first user characteristic information includes the action information, the third party device can be various motion devices, such as an acquisition patch for collecting each joint motion of the first user, a whole system image acquisition device, a 3D camera, a control handle, etc., and the third party device can also be a sports device integrated with a motion acquisition device, such as a treadmill, a bicycle, an elliptical machine, etc. Preferably, the third party device, by capturing the motions of the user, such as moving forward, moving backward, turning left, turning right, running, jumping, walking, waving, kicking, etc., to collect the action information of the first user. For another example, when the first user characteristic information includes the aspect information, the appearance of the first user can be collected at different angles by various types of cameras or camera combination devices, which can be a flat aspect information collection or a 360-degree omni-directional aspect information collection. For another example, when the first user characteristic information includes voice information, the voice information can be collected by various voice devices. In addition, the first user characteristic information can also be directly acquired by user device 2. Herein, preferably, user device 2 is loaded in the sports device or other acquisition device.

Herein, one ordinary person skilled in the art should understand that the above-described first user characteristic information is only illustrated as an example. If the other existing or the other possible first user characteristic information in the future can be applied to the present invention, it is also intended to be included in the scope of the present invention, and is hereby incorporated by reference herein.

Herein, one ordinary person skilled in the art should understand that the above-described various types of methods to acquire the first user characteristic information are only illustrated as examples. If the other existing or the other possible acquisition methods of first user characteristic information in the future can be applied to the present invention, they are also intended to be included within the scope of the present invention, and are hereby incorporated by reference herein.

Next, in step S304, the first user characteristic information is transmitted to network device 1 by user device 2 corresponding to the first user device 2. Accordingly, in step S301, the first user characteristic information is acquired by network device 1. Herein, according to the actual demand, user device 2 is set to transmit a part or all of first user characteristic information received or collected directly by the user device 2 to network device 1.

Next, in step S303, the first virtual object corresponding to the first user is generated by network device 1 based on the first user characteristic information. Herein, it is preferable that the first user characteristic information can include action information and aspect information of the first user. Wherein in step S303, the first virtual object corresponding to the first user is generated by network device 1 based on the first user characteristic information, wherein the first virtual object includes an appearance that matches the aspect information of the first user and an action sequence to be executed that matches the action information of the first user. Specifically, the first virtual object can be projected corresponding to a role of the first user in a virtual world corresponding to the current application, and a higher degree of authentic empathy is given to the first user by the first virtual object. Herein, it is preferable that the appearance of the first virtual object matches the aspect information of the first user to a certain extent or meets a certain matching threshold, so that the first virtual object referred to as the first user can be accurately projected in a virtual scene, and thus the first virtual object is very easily identifiable with respect to the first user. Herein, it is preferable that the appearance matching the aspect information of the first user can be generated by the three-dimensional reconstruction method. For example, a two-dimensional image of the first user is first acquired by a camera or a camera group; next, an effective imaging model is established by camera calibration to solve the internal and external parameters of the camera; and then, the shape characteristic information of the first user, including a characteristic point, a characteristic line or a characteristic area, is extracted through the two-dimensional image; further, a three-dimensional matching between the images is performed, that is, the corresponding relationship between the image pairs is established based on the extracted characteristics; and then, according to the three-dimensional matching result, the three-dimensional scene information can be re-built in combination with the internal and external parameters of the camera calibration. Herein, it is preferable that the action information of the first user in the real world can be mapped into an action sequence of the first virtual object to be executed in the virtual scene. Preferably, the one-to-one correspondence of the action can be realized by network device 1. For example, the first user in the real world performs actions such as moving forward, moving backward, turning left, turning right, jumping, walking, waving, kicking, etc, and the action information can be divided to extract the action characteristics, which are further mapped or copied into each action sequence to be executed. In the above-described embodiment of the present invention, the action information of the first user in the real world will be copied or similarly projected by the first virtual object in the corresponding virtual scene, to simulate the appearance of the real user, the action sequence to be executed, and etc., so that the operation empathy of the first user is greatly improved and the user experience is optimized.

Next, in step S305, the first interactive information is determined by network device 1, wherein the first interactive information is derived from the first user characteristic information. In step S307, the first virtual Object is transmitted to user device 2 of the second user that interacts with the first user by network device 1, wherein the first virtual object includes the first interactive information.

Specifically, each user corresponding to the interactive application can perform anthropomorphic interaction in the virtual scene through the respective virtual objects to realize the real interaction of the user across the region. Herein, preferably, the first user characteristic information includes voice information of the first user; wherein the first interactive information is determined by the network device 1, wherein the first interactive information is derived from the voice of the first user. Further, the first interactive information can also be derived from the action information of the first user, or the aspect information of the first user, and etc. Herein, the first user characteristic information can be directly acquired by the network device, and the corresponding first interactive information can be extracted from the first user characteristic information; or the first interactive information can also be determined by the network device from the first user characteristic information which is collected directly from the other third party devices, applications, or databases. Herein, specifically, audio information of the interactive information, such as audio contents including greeting, inquiry, etc., can be directly extracted from the voice information by the network device. Herein, it is also possible to extract the interactive information from the action information. For example, if the action information of the first user is waving his hand, the waving action is determined as an interactive information of greeting based on the pre-set matching rules by action characteristic matching. Specifically, the interactive information indicates waving to the second virtual object corresponding to the second user in the same virtual scene; for another example, if the action information of the first user is a gesture of OK, it represents the interactive information of agreement; for another example, if the action information of the first user is shaking his head, it represents an interactive information of disagreement. Furthermore, the first interactive information is included in the first virtual object generated by network device 1, and the form of the first interactive information can be the action sequence to be executed matching the action information, which corresponds to the interactive information, or the audio information matching voice information of the user. Herein, it is preferable that the virtual object of the second user and the virtual object of the first user correspond to the same virtual scene; further preferably, if there are a plurality of virtual objects to perform information interaction in the same virtual scene, the corresponding interaction rules can be preset to accurately target the corresponding interactive objects. For example, the corresponding location information in the virtual scene for the virtual object of each user is matched by network device 1, so that each user can identify and interact accurately with each other based on the respective location information; besides, the relative location between each virtual objects can be set and projected into the actual operations of each user. For example, if three users interact with each other based on the same virtual scene, in the virtual scene, the virtual object B is set on the left of the virtual object A, and the virtual object C is set on the right of the virtual object A. It then can be set that if the user A in the real world corresponding to the virtual object A waves his left hand for greeting, interactive information is sent to the user B corresponding to the virtual object B, while if the user A in the real world waves his right hand, interactive information is sent to the user C corresponding to the virtual objects C. Thus, the interaction object corresponding to the first interactive information can be determined by setting the above-described interactive rules.

It should be understood by one ordinary person skilled in the art that the above-described interaction rules are merely examples, and that the other existing or the other possible interactive rules in the future that can be applied to the present invention should be included within the scope of the present invention, and are hereby incorporated by reference herein.

In the present invention, the first virtual object corresponding to the first user is generated based on the acquired first user characteristic information by the network device, and the first interactive information of the first user are extracted based on the first user characteristic information, and further the first virtual object containing the first interactive information is transmitted to the user device of the second user that interacts the first user. Herein, the interactive information of the first user is provided to the user device of the second user who interacts with the first user based on the first virtual object. The first user characteristic information is virtualized into the first virtual object, so that the diverse and authenticated interactive requests of the first user in the real word are transmitted. And based on the present invention, it is possible to expect an interactive object, such as the second user, to be able to receive the interactive request. Herein, the above-described embodiments of the present invention enable real-world users to realize a real interaction between each other through the virtual objects in the virtual world, and the interactive information is diversified and anthropomorphic so that the user's realistic experience is greatly enhanced.

Preferably, the method further includes the step S309 (not shown in Drawings), the step S311 (not shown in Drawings), and the step S313 (not shown in Drawings).

Wherein, in step S309, the second user characteristic information of the second user provided based on the first interactive information is acquired by network device 1; in step S311, the second virtual object corresponding to the second user is generated by network device 1 based on the second user characteristic information. Wherein the second virtual object includes the second interactive information extracted from the second user characteristic information; in step S313, the second virtual object is provided to user device 2 corresponding to the first user by network device 1. Specifically, if the second user has a response to the first interactive information, the interactive response information corresponding to the first interactive information can be extracted from the second user characteristic information by network device 1, that is the second interactive information, and the second virtual object containing the second interactive information is provided to the user device of the first user. Here, the second user information and the second virtual object can refer to the first user information and the first virtual object, and similar descriptions are incorporated by reference herein.

In the preferred embodiment, the first interactive information of the first user can be extracted from the first user characteristic information and sent to user device 2 of the second user that interacts with the first user by network device 1. Further, network device 1 can receive the second virtual object containing the second interactive information provided by the second user based on the first interactive information, and provide the second virtual object to the first user device 2. Wherein the interactive information can be extracted from voice information and/or action information of the user. Herein, the real-world users can realize a real interaction between each other through the virtual objects in the virtual world, and due to the diversification and anthropomorphism of the interactive information, the user's realistic experience is greatly enhanced.

Figure 2:
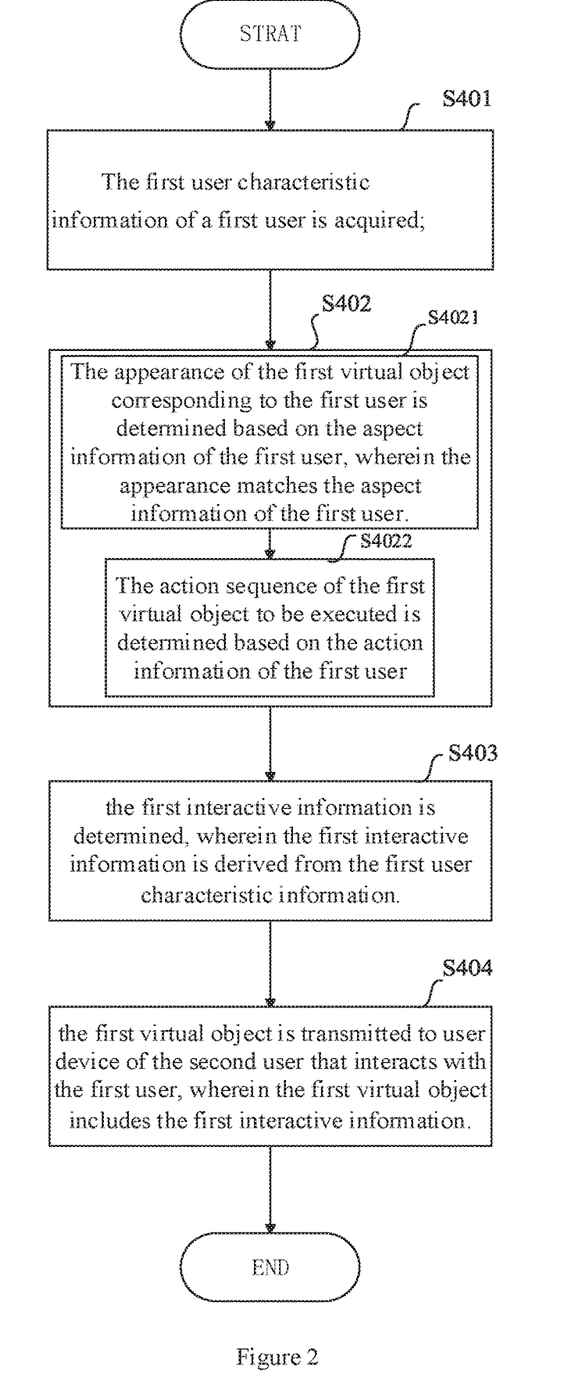
FIG. 2 shows a flow chart of a method for user interaction based on a virtual object at a network device according to a preferred embodiment of the present invention.

FIG. 2 shows a flow chart of a method for user interaction based on a virtual object at a network device according to some preferred embodiments of the present invention.

Wherein the step includes step S401, step S402, step S403, and step S404. Wherein the step S402 includes step S4021 and step S4022. Wherein in step S4021, the appearance of the first virtual object corresponding to the first user is determined by network device 1 based on the aspect information of the first user, wherein the appearance matches the aspect information of the first user. In step S4022, the action sequence of the first virtual object to be executed is determined by network device 1 based on the action information of the first user. Here, the steps S401, S403, and S404 are the same as or substantially the same as the steps S301, S305 and S307 shown in FIG. 1, and thus are not repetitively described herein, instead, these steps are hereby incorporated by reference.

Specifically, in step S4021, the appearance of the first virtual object corresponding to the first user is determined by network device 1 based on the aspect information of the first user, wherein the appearance matches the aspect information of the first user. Herein, for the higher degree of authentic empathy of the first user brought by the first virtual object, the aspect characteristic information of the aspect information of the first user is extracted, or the aspect sub-characteristic information is further extracted based on the aspect information. Further, the appearance of the first virtual object is determined according to the aspect characteristic information or the aspect sub-characteristic information, and the appearance is required to match the aspect information of the first user. For example, when the matching is reached to a certain extent, or meets a certain matching threshold, the first virtual object is very easily identifiable with respect to the first user. Preferably, the appearance is highly similar to the aspect information.

In addition, in step S4021, the action sequence to be executed of the first virtual object is determined by network device 1 based on the action information of the first user. Herein, it is preferable that the action information of the first user in the real world can be mapped into an action sequence of the first virtual object to be executed in the virtual scene. Preferably, the network device 1 can realize the one-to-one correspondence of actions. For example, the first user moves forward and backward, turns left and right, jump, walk, waving, kick, etc. in the real world, and the collected action information, such as an action image information, or a preset action signal of a body, can be decomposed to extract action characteristics, so as to determine the action sequence to be executed. For example, the action information is copied or similarly mapped as the action sequence to be executed. Herein, a preferred effect is that the other users can infer the action information of the first user without any doubt from the action sequence of the first virtual object.

Preferably, the step S4021 includes step S40211 (not shown in Drawings) and step S40212 (not shown in Drawings). Wherein, in step S40211, the corresponding appearance sub-characteristic information is determined by network device 1 based on the aspect sub-characteristic information contained in the aspect information of the first user, wherein each appearance sub-characteristic information matches with the corresponding aspect sub-characteristic information. In step S40212, a plurality of appearance sub-characteristic information is synthesized to obtain the appearance of the first virtual object corresponding to the first user by network device 1.

Specifically, the aspect information of the first user can correspond to a plurality of aspect sub-characteristic information. For example, a plurality of aspect sub-characteristic information is determined by facial features, hairstyle, figure, clothing, accessories, etc., of the user, so that the corresponding appearance sub-characteristic information is determined corresponding to each aspect sub-characteristic information. Herein, it is preferable that the matching of the aspect sub-characteristic information and the appearance sub-characteristic information can be conducted in the preset characteristic database through each of the collected aspect sub-characteristic information. Wherein the characteristic database stores a large number of appearance sub-characteristic information. For example, based on the aspect sub-characteristic information corresponding to the hairstyle information of the first user, a certain appearance sub-characteristic information that matches with the aspect sub-characteristic information corresponding to the hairstyle information of the first user is determined from the aspect sub-characteristic information related to the hairstyle, such as a plurality of the aspect sub-characteristic information including a1, a2 . . . am. Herein, the acquisition of each aspect sub-characteristic information can be a unified acquisition, or a separate acquisition. Next, a plurality of the aspect sub-characteristic information is synthesized to generate the overall appearance of the first virtual object corresponding to the first user by network device 1. For example, image combination are conducted for each appearance sub-characteristic information corresponding to the aspect sub-characteristic information, such as facial features, hairstyle, figure, clothing, accessories and etc., to obtain a complete first virtual object.

More preferably, in step S40211, the corresponding appearance sub-characteristic information is respectively determined by network device 1 based on the aspect sub-characteristic information contained in the aspect information of the first user, wherein the matching degree information between each appearance sub-characteristic information and the corresponding aspect sub-characteristic information is larger than or equal to the predetermined sub-characteristic matching threshold information.

Specifically, in order to ensure that the first virtual object is very easily identifiable with respect to the first user, preferably, the similarity between the appearance and the aspect information must reach a certain threshold value. Specifically, the matching degree information between each appearance sub-characteristic information and the corresponding aspect sub-characteristic information is not less than the predetermined sub-characteristic matching threshold information. It is assumed that $\{A1, A2 \ldots An\}$ represents a set of the aspect sub-characteristic information corresponding to the first user, wherein n is a positive integer, and Ai (i is a positive integer) represents the i-th aspect sub-characteristic information. It is further assumed that $\{B1, B2 \ldots Bn\}$, represents a set of appearance sub-characteristic information one-to-one corresponding to each of the aspect sub-characteristic information described above, wherein n is a positive integer, Bi (i is a positive integer) represents the appearance sub-characteristic information corresponding to the i-th aspect sub-characteristic information Ai. Herein, it is required that $S(Ai, Bi) \geq Vi$, $1 \ll i \ll n$, i is a positive integer, wherein the $S(Ai, Bi)$ represents the matching degree information between each appearance sub-characteristic information and the corresponding aspect sub-characteristic information. The Vi represents the sub-characteristic matching threshold information corresponding to the i-th appearance sub-characteristic information. The sub-characteristic matching threshold information corresponding to each appearance sub-characteristic information can be set to be the same or different.

Further, preferably, step S4021 includes step S40213 (not shown in Drawings) and step S40214 (not shown in Drawings). Wherein, in step S40213, the comprehensive matching degree information between the appearance and the aspect information of the first user is determined by network device 1, based on the matching degree information between each appearance sub-characteristic information and the corresponding aspect sub-characteristic information. In step S40214, if the comprehensive matching degree information is smaller than the predetermined comprehensive matching threshold information of the user and the virtual object, the steps S4021 and S4022 are re-executed by network device 1 until the comprehensive matching degree information is larger than or equal to the comprehensive matching threshold information.

Specifically, in the present embodiment, it not only requires that the matching degree information between each appearance sub-characteristic information and the corresponding aspect sub-characteristic information reaches a certain threshold value, but also requires that the matching degree information of the comprehensive matching degree information between the appearance and the aspect information of the first user also needs to reach a certain threshold. Take the above assumptions for example, it further requires that $R(\{A1, A2 \ldots An\}, \{B1, B2 \ldots Bn\}) = \Sigma_{i=1}^{n} W_i S(AI, Bi) \geq U_i$, $1 \leq i \leq n$, i is a positive integer, wherein the R represents the comprehensive matching degree information between the appearance and the aspect information of the first user, the $S(Ai, Bi)$ represents the matching degree information between each appearance sub-characteristic information and the corresponding aspect sub-characteristic information, the $W_i$ represents the weight information of the i-th aspect sub-characteristic information/appearance sub-characteristic information, the $U_i$ represents the predetermined comprehensive matching threshold information between the virtual object and the preset user. Herein, the weight information of the different aspect sub-characteristic information/appearance sub-characteristic information can be set to be the same or different based on the actual needs.

Next, when comprehensive matching degree information is smaller than the predetermined comprehensive matching threshold information, the steps S4021 and S4022 are re-performed until the comprehensive matching degree information is larger than or equal to the comprehensive matching threshold information. Herein, if the comprehensive matching degree information is smaller than the predetermined matching threshold information, the appearance of the first virtual object corresponding to the first user is re-determined based on the aspect information of the first user. Wherein, the appearance matches the aspect information of the first user, and an action sequence of the first virtual object to be executed is determined based on the action information of the first user. Herein, it is possible to re-determine the appearance sub-characteristic information corresponding to the calculated aspect sub-characteristic information and increase the value of the sub-characteristic matching threshold information, so that the matching degree between the re-determined appearance sub-characteristic information and the corresponding aspect sub-characteristic information is increased; or, the other aspect sub-characteristic information which has not been calculated corresponding to the aspect information of the first user can be increased, and thus the kind and the number of the aspect sub-characteristic information are increased to increase the value of the comprehensive matching degree information, to achieve a more accurate matching.

In a preferred embodiment (referring to FIG. 1), in step S301, the first user characteristic information of the first user on the treadmill is acquired by network device 1; wherein in step S303, the first virtual object which performs the running corresponding to the first user is generated by network device 1 based on the first user characteristic information.

Specifically, in the above-described embodiment of the present invention, scenes where the users interact with each other based on the virtual objects can simulate various real-life scenes, such as various sports scenes, and more specifically, a scene where a user runs in the present embodiment. In reality, the first user performs a running action on the treadmill, the first user characteristic information related to the running movement of the first user on the treadmill is acquired by network device 1. The first user characteristic information can include running action information and/or running speed information of the first user on the treadmill; further, the first virtual object corresponding to the first user which performs the running action is generated by network device 1 based on the first user characteristic information; next, the first interactive information extracted based on the first user characteristic information is provided with the first virtual object to the user device of the second user that interacts with the first user. Preferably, the second user is also involved in a corresponding running virtual scene, and the running action of the second user in the real life, such as the action on a treadmill is mapped into the virtual scene.

The above embodiments of the present invention can simulate different virtual scenes based on different actual life scenes in reality, for example, in the present embodiment, based on the running of the user on the treadmill, a corresponding running scene is simulated; and for another example, even though the first user and the second user do not run together in reality, they can run together in the virtual scene that simulates running based on their own virtual objects, interact by voices, interact by actions and perform other interactions, so that users can experience simulated virtual interactions without relying too much on realistic environment conditions.

In the present embodiment, the treadmill can be a device independent of user device 2 corresponding to the first user, the treadmill is user device 2 itself, or user device 2 is loaded on the treadmill.

Further, it is preferable that the first user characteristic information includes running action information and/or running speed information of the first user on the treadmill; wherein in step S303, the first virtual object that performs running corresponding to the first user is generated by network device 1 based on the first user characteristic information. Wherein, the first virtual object satisfies at least one of the following: Virtual running action information corresponding to the first virtual object matches the running action information of the first user on the treadmill; the virtual running speed information corresponding to the first virtual object matches the running speed information of the first user on the treadmill.

Specifically, the running action information includes various action information performed by the first user on the treadmill. The running action information can be a normal running action such as slow running, quick running, etc., or can also be walking, jumping, or other customized action information. Herein, it is preferable that the running information can be captured by the collecting device loaded on the treadmill, or a third party collecting device. For example, the running action information is collected by sensing the pressure information of the first user on the running area of the treadmill by the sensing device, and, for another example, the image acquisition and analysis are conducted through a camera device. Herein, the running speed information is related to the running states, such as slow running, quick running, a stop, and other various states. The running speed information can be represented as a specific speed value. Preferably, the running speed information corresponding to the first user is determined based on the currently set speed of the treadmill. Herein, the first virtual object which performs a running action, corresponding to the first user based on the first user characteristic information is generated by network device 1. Wherein the first virtual object satisfies at least one of the following: The virtual running action information corresponding to the first virtual object matches the running action information of the first user on the treadmill. For example, when the first user starts to run on the treadmill, the virtual running action information of the first virtual object also corresponds to the starting action of the object. The virtual running speed information corresponding to the first virtual object matches the running speed information of the first user on the treadmill. For example, if the running speed of the first user on the treadmill is changed from slow to fast, and then the corresponding virtual running speed information also correspondingly represents the change from slow to fast. Here, the matching between the virtual running information and the running action information, and the matching between the virtual running speed information and the running speed information needs to merely satisfy a predetermined correspondence relationship. Preferably, the virtual running action information and virtual running speed information can represent the corresponding related running information in reality to a full extent.

In the present embodiment, the virtual scene corresponds to a sports scene of running. Further, the first user characteristic information can include running action information and/or running speed information of the first user on the treadmill. Herein, different virtual scenes can be simulated based on various active scenes in reality by the above-described embodiments of the present invention. For example, in the present embodiment, the running scene is simulated based on the running of the user on the treadmill. For another example, other movements or other interactive environment can be simulated, so that people can interact with each other when exercising in various types of virtual scenes to enhance the real experience of the user. As a result, the users can experience virtual sports interactions without relying too much on realistic environment conditions.

In a preferred embodiment (referring to FIG. 1), the method further includes a step S309 (not shown in Drawings), wherein, in step S309, the first virtual object is provided to the user device corresponding to the first user by network device 1. Herein, it is preferable that the first virtual object includes an appearance matching the aspect information of the first user and an action sequence to be executed matching the action information of the first user. Herein, the first virtual object generated based on the first user characteristic information of the first user is provided to the first user, so that the first user can experience the projection from the real world to the virtual world, and thus the role involvement is achieved.

In another preferred embodiment (see FIG. 1) corresponding thereto, the method further includes a step S306 (not shown in Drawings) and a step S308 (not shown in Drawings).

Wherein, in step S306, the first virtual object provided by the network device is received by user device 2, wherein the first virtual object includes an appearance that matches the aspect information of the first user, and an action sequence to be executed that matches the action information of the first user. Herein, the first virtual object generated based on the first user characteristic information of the first user is provided to the first user, so that the first user can experience the projection from the real world to the virtual world, and thus the role involvement is achieved.

Next, in step S308, the first virtual object is provided to a corresponding virtual reality device by user device 2, for executing the first virtual object through the virtual reality device. Herein, the virtual reality device includes, but is not limited to, VR (Virtual Reality) devices, or AR (Augmented Reality) devices. Herein, the virtual scene corresponding to the virtual reality device will simulate the user's sensory experience such as visual experience, auditory experience, tactile experience and so on, so that the operating user can have an immersive experience as if he was personally on the scene. Herein, user device 2 and the virtual reality device can be separate devices, or user device 2 and the virtual reality device are integrated in a device as a whole, for example, user device 2 is loaded in the virtual reality device. Herein, the first virtual object is provided to a corresponding virtual reality device by user device 2, to render the first virtual object for the corresponding first user through the virtual reality device.

In the present embodiment, user device 2 cooperates with network device 1 to provide the collected first user characteristic information to the corresponding network device 1; and the first virtual object received from network device 1 is provided to the corresponding virtual reality device, and the first virtual object is executed in the virtual reality device. Herein, the first virtual object provided to the user based on the descried-above embodiment of the present invention can be presented in a three-dimensional virtual world presented by the virtual reality device in a manner, which is different from the presenting effect of conventional televisions, personal computers, and mobile phones and other devices. The first virtual object can bring a comprehensive immersive interactive experience to the user with the presenting effect approaching the true senses.

Preferably, the method further includes a step S311 (not shown in Drawings). In the step S311, the third virtual object in the same virtual scene as the first virtual object is acquired by network device 1; wherein, in step S309, the first virtual object and the third virtual object are provided to user device 2 corresponding to the first user by network device 1.

Further preferably, in step S306, the first virtual object corresponding to the first user characteristic information and the third virtual object that is in the same virtual scene as the first virtual object are provided by the network device and received by user device 2. Wherein the first virtual object includes an appearance that matches the aspect information of the first user and an action sequence to be executed that matches the action information of the first user; in step S308, the first virtual object and the third virtual object are provided to a corresponding virtual reality device by user device 2, for executing the first virtual object and the third virtual object through the virtual reality device.

Specifically, the actual interactive application may correspond to a plurality of users, and the respective virtual object corresponding to each user can correspond to the same virtual scene, wherein the virtual scene corresponds to a non-realistic fictional space where each virtual object moves. For example, the virtual scene can be an abstract motion space, or any fictional space simulating reality scenes. Further, it is preferable that the virtual scene corresponding to the first user has another virtual object other except for the first virtual object, such as the third virtual object. Here, not only can the third virtual object be a virtual object generated by the other user based on the corresponding user characteristic information, but also the third virtual object can be a virtual object generated and controlled directly by the system. Herein, preferably, similar to the first virtual object, the third virtual object can also include an appearance that matches the aspect information of the corresponding user and an action sequence to be executed that matches the action information of the corresponding user; or the third virtual object includes a corresponding appearance or an action sequence to be executed preset by the system. Thus, a scene that users from different areas meet each other in the same virtual scene through their respective virtual objects is built.

More preferably, the method further includes a step S313 (not shown in Drawings). In the step S313, one or more virtual objects in the virtual scene where the first virtual object is located are determined by network device 1; next, in step S311, the third virtual object corresponding to the first virtual object is determined by network device 1 from the one or more virtual objects.

Specifically, there is one or more virtual objects in the same virtual scene corresponding to the current interactive application, and the correspondence relationship between the virtual scene and the virtual object can result from the selection by the corresponding user. For example, the user makes a preference selection based on the theme of the virtual scene; or the correspondence relationship results from the automatic assignment based on the actual needs of different users by network device 1. For example, the virtual scene which matches the corresponding user will be provided by network device 1 based on the collected characteristic information of the user. Further, in combination with the actual interactive contents corresponding to the virtual scene, it is also possible to determine the third virtual object corresponding to the first virtual object from one or more virtual objects corresponding to the same virtual scene. That is, the part or all of the other virtual objects in the same virtual scene where the first virtual object is located can be correspondingly matched with and provided to the first user. Hereby, the selectivity of the obtained virtual information is more flexible and diverse for the user corresponding to each virtual object in the virtual scene.

In the present embodiment, one or more virtual objects in the virtual scene where the first virtual object is located can be determined; and further, the third virtual object corresponding to the first virtual object is determined from one or more virtual objects. Herein, in the above-described embodiment of the present invention, by matching each of the virtual objects, a scene is realized that the users from different areas meet in the same virtual scene through the respective virtual objects, and a foundation is laid for the users from different areas to make anthropomorphic communication afterwards through their virtual objects in the virtual interface.

Preferably, in step S309, the first virtual object, the third virtual object, and the virtual scene are provided to user device 2 corresponding to the first user by network device 1. Herein, it is preferable that the first virtual object and the third virtual object can be loaded in a matching virtual scene and provided to the user device 2 corresponding to the first user. In the virtual scene, the elements of the virtual scene, such as the background, architecture, etc. in virtual scenes, can be adjusted based on the user's choice, or the system settings. Herein, the first virtual object and the third virtual object, together with the diversified virtual scenes, can further enrich the sensory experience of the first user, and the immersive involvement of the user is further enhanced.

In the above-described embodiment of the present invention, in an application scenario that a plurality of virtual objects are in the same virtual scene, the third virtual object corresponding to the first virtual object can be determined from one or more virtual objects based on the motion characteristic information corresponding to each virtual object. Wherein the motion characteristic information includes running characteristic information. Herein, the operations of the virtual object in the virtual scene can be combined with the sports experience of the user, for example, the running action of the user, etc., i.e., the sports experience of the user in the real world is projected into the related motion operations of the virtual object in the virtual scene. Thus, the corresponding virtual objects can be matched with each other based on the motion characteristic information corresponding to each virtual object, so that there are better motion interactions between the users respectively corresponding to the first virtual object and the third virtual objects, thereby enhancing the user experience. For example, the third virtual object corresponding to the first virtual object can be selected based on the information, such as a running scene, a running level, etc.

In a preferred embodiment, in step S311, the third virtual object corresponding to the first virtual object is determined from one or more virtual objects by network device 1, according to the motion characteristic information corresponding to each virtual object. Wherein the motion characteristic information includes running characteristic information.

Specifically, in different types of interactive applications, different types of the interactive operations will be executed through the first virtual object corresponding to the user. Herein, preferably, if the interactive application is associated with a motion operation, for example, the interactive application is a simulated sports game, the first virtual object of the first user represents the corresponding motion characteristic information. Wherein the motion characteristic information includes running characteristic information, for example, the running scene information related to running, or running level information, etc. Herein, the corresponding third virtual object can be determined for the first virtual object based on the running characteristic information.

Preferably, in step S311, according to predetermined pairing rules, the third virtual object corresponding to the first virtual object is determined by network device 1 from one or more virtual objects based on the running characteristic information corresponding to each virtual object, wherein the running characteristic information of the first virtual object and the running characteristic information of the third virtual object satisfy the pairing rules. Wherein the pairing rules include at least one of the following rules: the running scene of the third virtual object is the same as that of the first virtual object; the running level of the third virtual object matches that of the first virtual object.

Specifically, herein, the running scene includes, but is not limited to, various virtual running environments such as standard athletic tracks, seaside areas, deserts, and the etc. The running level includes, but is not limited to, sex of runners, running types such as short-distance running, long-distance running, relay running, and running speed, such as slow running, fast running and so on. Herein, the pairing rules are set so as to optimize the motion interaction effects between the user of the first virtual object and the user of the corresponding third virtual object. For example, the running scenes of the first virtual object and the third virtual object are both athletic tracks; for another example, the running levels of the first virtual object and the third virtual object are both female players and slow running. Herein, the running characteristic information represents the running ability of the virtual object corresponding to the user, or the running requirements. When the running environments between the users, or between the corresponding virtual objects of the users are the same, or the running abilities are equivalent, there is better sports realism and sports competitive experience for the first user or the corresponding interactive object in the virtual scene. It should be understood by the ordinary person skilled in the art that the above pairing rules are merely examples, and the other existing rules or the other possible pairing rules in the future that can be applied to the present invention should be included within the scope of the present invention, and is hereby incorporated by reference herein.

In the present embodiment, in an application scenario that a plurality of virtual objects are located in the same virtual scene, the third virtual object corresponding to the first virtual object can be determined from one or more virtual objects based on the motion characteristic information corresponding to each virtual object. Wherein the motion characteristic information includes running characteristic information. Herein, the operations of the virtual object in the virtual scene can be combined with the sports experience of the user, for example, the running of the user, etc., i.e., the sports experience of the user in the real world is projected into the related motion operations of the virtual object in the virtual scene. Thus, the corresponding virtual objects can be paired with each other based on the motion characteristic information corresponding to each virtual object, so that there are optimal sports interactions between users respectively corresponding to the first virtual object and the third virtual object which match with each other, thereby enhancing the user experience. For example, the third virtual object corresponding to the first virtual object can be selected based on the information, such as a running scene, a running level, etc.

In the present invention, the user device cooperates with the network device to provide the acquired characteristic information of the first user to the corresponding network device. Further, the first virtual object received from the network device is provided to the corresponding virtual reality device, and the first virtual object is executed in the virtual reality device. Herein, the first virtual object provided to the user based on the present invention can be presented in a three-dimensional virtual world presented by the virtual reality device in a manner, which is different from the presenting effect of conventional televisions, personal computers, and mobile phones and other devices. The first virtual object can bring a comprehensive immersive interactive experience to the user with the presenting effect approaching the true senses.

It will be apparent to one ordinary person skilled in the art that the present invention is not limited to the details of the above-described exemplary embodiments, and that the invention can be implemented in other specific mode without departing from the spirits or essential characteristics of the present invention. Thus, the present embodiments are considered in all respects to be illustrative, rather than to be restrictive. The scope of the present invention is defined by the appended claims, rather than by the foregoing description, therefore it is aimed that the changes within the implication and scope of equivalents of the claims all fall within the scope of the present invention. Any reference signs of the drawings in the claims should not be construed as a limitation to the claims. In addition, it is clear that the term "including" does not exclude other units or steps, and the singular does not exclude the plural. The plurality of units or devices recited in the device claims can also be implemented by a unit or device through software or hardware. The first, the second and other words are used to represent the name, and does not indicate any particular order.

What is claimed is:

1. A method for user interaction based on virtual objects at a network device, comprising:
   acquiring a first user characteristic information of a first user;
   generating a first virtual object corresponding to the first user based on the first user characteristic information;
   determining first interactive information, wherein the first interactive information is derived from the first user characteristic information;
   transmitting the first virtual object and the first interactive information to a user device of a second user that interacts with the first user; wherein the first virtual object is used to perform the first interactive information;
   wherein the first user characteristic information comprises action information and aspect information of the first user; the first virtual object comprises an appearance matching with the aspect information of the first user, and an action sequence to be executed matching with the action information of the first user;

wherein the steps of generating the first virtual object comprises:

step 1: determining the appearance of the first virtual object corresponding to the first user based on the aspect information of the first user, wherein the appearance matches the aspect information of the first user; and step 2: determining the action sequence to be executed of the first virtual object based on the action information of the first user;

wherein the step of determining the appearance of the first virtual object comprises:

determining corresponding appearance sub-characteristic information according to aspect sub-characteristic information included in the aspect information of the first user, wherein each of the appearance sub-characteristic information correspondingly matches the corresponding aspect sub-characteristic information and synthesizing a plurality of appearance sub-characteristic information to obtain the appearance of the first virtual object corresponding to the first user; and a comprehensive matching degree information between the appearance and the aspect information of the first user is determined by the network device based on matching degree information between each of the appearance sub-characteristic information and each corresponding aspect sub-characteristic information, and when the comprehensive matching degree information is smaller than a predetermined comprehensive matching threshold information of the first user and the first virtual object, then steps 1 and 2 are re-executed by the network device until the comprehensive matching degree information is larger than or equal to the comprehensive matching threshold information.

2. The method according to claim 1, further comprising:

acquiring second user characteristic information provided by the second user in response to the first interactive information;

generating a second virtual object corresponding to the second user based on the second user characteristic information, wherein the second virtual object is used to perform second interactive information extracted from the second user characteristic information; and providing the second virtual object and the second interactive information to a user device corresponding to the first user.

3. The method according to claim 1, wherein the first user characteristic information includes voice information of the first user, and the first interactive information is derived from the voice information of the first user.

4. The method according to claim 1, wherein the first user characteristic information of the first user includes the first user characteristic information of the first user on a treadmill, the step of generating the first virtual object comprises:

generating the first virtual object that performs a running motion corresponding to the first user based on the first user characteristic information.

5. The method according to claim 4, wherein the first user characteristic information includes running action information and/or running speed information of the first user on the treadmill, the first virtual object that performs a running motion corresponding to the first user satisfies at least one item as below:

virtual running action information corresponding to the first virtual object matches the running action information of the first user on the treadmill; and virtual running speed information corresponding to the first virtual object matches the running speed information of the first user on the treadmill.

6. The method according to claim 1, further comprising: providing the first virtual object to a user device corresponding to the first user.

7. The method according to claim 6, further comprising:

acquiring a third virtual object in the same virtual scene as the first virtual object; and providing the third virtual object to the user device corresponding to the first user.

8. The method according to claim 7, further comprising:

determining one or more virtual objects in a virtual scene where the first virtual object is located;

wherein the step of acquiring the third virtual object comprises:

determining the third virtual object corresponding to the first virtual object from the one or more virtual objects.

9. The method according to claim 7, further comprising:

providing the virtual scene to the corresponding user device of the first user.

10. The method according to claim 8, wherein the step of determining the third virtual object comprises:

determining the third virtual object corresponding to the first virtual object from the one or more virtual objects based on motion characteristic information corresponding to each virtual object, wherein the motion characteristic information includes running characteristic information.

11. The method according to claim 10, wherein the step of determining the third virtual object comprises:

determining the third virtual object corresponding to the first virtual object from the one or more virtual objects according to the running characteristic information corresponding to each virtual object, based on a predetermined pairing rule;

wherein the predetermined pairing rule include at least one of the following:

a running motion scene of the first virtual object is the same as that of the third virtual object; and a running level of the first virtual object matches a running level of the third virtual object.

12. A method for user interaction based on virtual objects at a user device, comprising:

acquiring first user characteristic information of a first user, wherein the first user characteristic information includes at least one of action information, aspect information and speed information of the first user; and transmitting the first user characteristic information to a network device corresponding to a first user device;

wherein the first user characteristic information comprises the action information and the aspect information of the first user; a first virtual object comprises an appearance matching with the aspect information of the first user, and an action sequence to be executed matching with the action information of the first user;

wherein steps of generating the first virtual object comprises:

step 1: determining the appearance of the first virtual object corresponding to the first user based on the aspect information of the first user, wherein the appearance matches the aspect information of the first user; and step 2: determining the action sequence to be executed of the first virtual object based on the action information of the first user;

wherein the step of determining the appearance of the first virtual object comprises:

determining corresponding appearance sub-characteristic information according to aspect sub-characteristic information included in the aspect information of the first user, wherein each of the appearance sub-characteristic information correspondingly matches the corresponding aspect sub-characteristic information and synthesizing a plurality of appearance sub-characteristic information to obtain the appearance of the first virtual object corresponding to the first user; and a comprehensive matching degree information between the appearance and the aspect information of the first user is determined by the network device based on matching degree information between each of the appearance sub-characteristic information and each corresponding aspect sub-characteristic information, and when the comprehensive matching degree information is smaller than a predetermined comprehensive matching threshold information of the first user and the first virtual object, then steps 1 and 2 are re-executed by the network device until the comprehensive matching degree information is larger than or equal to the comprehensive matching threshold information.

13. The method according to claim 12, further comprising:

receiving the first virtual object corresponding to the first user characteristic information provided by the network device; and providing the first virtual object to a corresponding virtual reality device, for executing the first virtual object through the virtual reality device.

14. The method according to claim 13, further comprising:

receiving a third virtual object, wherein the third virtual object and the first virtual object are in the same virtual scene, and the third virtual object is provided by the network device; and providing the third virtual object to the corresponding virtual reality device, so as to execute the third virtual object through the virtual reality device.

15. A non-volatile storage medium, wherein one or more instructions are stored in the non-volatile storage medium; the one or more instructions are executed by one or more processors, such that the one or more processors perform:

acquiring first user characteristic information of a first user;

generating a first virtual object corresponding to the first user based on the first user characteristic information;

determining first interaction information, wherein the first interaction information is derived from the first user characteristic information; and sending the first virtual object and the first interactive information to a user device of a second user that interacts with the first user, wherein the first virtual object is used to perform the first interactive information;

wherein the first user characteristic information comprises action information and aspect information of the first user; the first virtual object comprises an appearance matching with the aspect information of the first user, and an action sequence to be executed matching with the action information of the first user;

wherein the steps of generating the first virtual object comprises:

Step 1: determining the appearance of the first virtual object corresponding to the first user based on the aspect information of the first user, wherein the appearance matches the aspect information of the first user; and Step 2: determining the action sequence to be executed of the first virtual object based on the action information of the first user;

wherein the step of determining the appearance of the first virtual object comprises:

determining corresponding appearance sub-characteristic information according to aspect sub-characteristic information included in the aspect information of the first user, wherein each of the appearance sub-characteristic information correspondingly matches the corresponding aspect sub-characteristic information and synthesizing a plurality of appearance sub-characteristic information to obtain the appearance of the first virtual object corresponding to the first user; and a comprehensive matching degree information between the appearance and the aspect information of the first user is determined by a network device based on matching degree information between each of the appearance sub-characteristic information and each corresponding aspect sub-characteristic information, and when the comprehensive matching degree information is smaller than a predetermined comprehensive matching threshold information of the first user and the first virtual object, then steps 1 and 2 are re-executed by the network device until the comprehensive matching degree information is larger than or equal to the comprehensive matching threshold information.

16. A non-volatile storage medium, wherein one or more instructions are stored in the non-volatile storage medium; the one or more instructions are executed by one or more processors, such that the one or more processors perform:

acquiring first user characteristic information of a first user, wherein the first user characteristic information includes at least one of action information, aspect information and speed information of the first user; and transmitting the first user characteristic information to a network device corresponding to the first user device;

wherein the first user characteristic information comprises the action information and the aspect information of the first user; a first virtual object comprises an appearance matching with the aspect information of the first user, and an action sequence to be executed matching with the action information of the first user;

wherein steps of generating the first virtual object comprises:

Step 1: determining the appearance of the first virtual object corresponding to the first user based on the aspect information of the first user, wherein the appearance matches the aspect information of the first user; and Step 2: determining the action sequence to be executed of the first virtual object based on the action information of the first user;

wherein the step of determining the appearance of the first virtual object comprises:

determining corresponding appearance sub-characteristic information according to aspect sub-characteristic information included in the aspect information of the first user, wherein each of the appearance sub-characteristic information correspondingly matches the corresponding aspect sub-characteristic information and synthesizing a plurality of appearance sub-characteristic information to obtain the appearance of the first virtual object corresponding to the first user; and a comprehensive matching degree information between the appearance and the aspect information of the first user is determined by the network device based on matching degree information between each of the appearance sub-characteristic information and each corresponding aspect sub-characteristic information, and when the comprehensive matching degree information is smaller than a predetermined comprehensive matching threshold information of the first user and the first virtual object, then steps 1 and 2 are re-executed by the network device until the comprehensive matching degree information is larger than or equal to the comprehensive matching threshold information.

17. A user device, comprising:

one or more processors; and a storage device for storing one or more instructions; when the one or more instructions are executed by the one or more processors, such that the one or more processors perform:

acquiring first user characteristic information of a first user, wherein the first user characteristic information includes at least one of action information, aspect information and speed information of the first user; and transmitting the first user characteristic information to a network device corresponding to the first user device;

wherein the first user characteristic information comprises the action information and the aspect information of the first user; a first virtual object comprises an appearance matching with the aspect information of the first user, and an action sequence to be executed matching with the action information of the first user;

wherein steps of generating the first virtual object comprises:

Step 1: determining the appearance of the first virtual object corresponding to the first user based on the aspect information of the first user, wherein the appearance matches the aspect information of the first user; and Step 2: determining the action sequence to be executed of the first virtual object based on the action information of the first user;

wherein the step of determining the appearance of the first virtual object comprises:

determining corresponding appearance sub-characteristic information according to aspect sub-characteristic information included in the aspect information of the first user, wherein each of the appearance sub-characteristic information correspondingly matches the corresponding aspect sub-characteristic information and synthesizing a plurality of appearance sub-characteristic information to obtain the appearance of the first virtual object corresponding to the first user; and a comprehensive matching degree information between the appearance and the aspect information of the first user is determined by the network device based on matching degree information between each of the appearance sub-characteristic information and each corresponding aspect sub-characteristic information, and when the comprehensive matching degree information is smaller than a predetermined comprehensive matching threshold information of the first user and the first virtual object, then steps 1 and 2 are re-executed by the network device until the comprehensive matching degree information is larger than or equal to the comprehensive matching threshold information.

18. The user device according to claim 17, wherein the user device comprises a virtual reality device, a sports device, or a collection device.

* * * * *